(12) United States Patent
Deeba et al.

(10) Patent No.: US 10,512,898 B2
(45) Date of Patent: Dec. 24, 2019

(54) LAYERED AUTOMOTIVE CATALYST COMPOSITES

(71) Applicant: BASF Corporation, Florham Park, NJ (US)

(72) Inventors: Michel Deeba, East Brunswick, NJ (US); Yipeng Sun, West Windsor, NJ (US); Tian Luo, Piscataway, NJ (US); Emi Leung, Somerset, NJ (US); Pavel Ruvinskiy, Iselin, NJ (US); Dinh Dang, Somerset, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/738,858

(22) PCT Filed: Jun. 24, 2016

(86) PCT No.: PCT/US2016/039162
§ 371 (c)(1),
(2) Date: Dec. 21, 2017

(87) PCT Pub. No.: WO2016/210221
PCT Pub. Date: Dec. 29, 2016

(65) Prior Publication Data
US 2018/0178198 A1 Jun. 28, 2018

Related U.S. Application Data

(60) Provisional application No. 62/184,215, filed on Jun. 24, 2015.

(51) Int. Cl.
| | |
|---|---|
| *B01D 53/94* | (2006.01) |
| *B01J 23/63* | (2006.01) |
| *B01J 35/00* | (2006.01) |
| *B01J 35/04* | (2006.01) |
| *F01N 3/035* | (2006.01) |
| *F01N 3/10* | (2006.01) |
| *B01J 37/02* | (2006.01) |

(52) U.S. Cl.
CPC ............ *B01J 23/63* (2013.01); *B01D 53/945* (2013.01); *B01J 35/0006* (2013.01); *B01J 35/04* (2013.01); *B01J 37/0234* (2013.01); *B01J 37/0244* (2013.01); *B01J 37/0248* (2013.01); *F01N 3/035* (2013.01); *F01N 3/101* (2013.01); *B01D 2255/1023* (2013.01); *B01D 2255/1025* (2013.01); *B01D 2255/204* (2013.01); *B01D 2255/2042* (2013.01); *B01D 2255/2063* (2013.01); *B01D 2255/2065* (2013.01); *B01D 2255/2092* (2013.01); *B01D 2255/20715* (2013.01); *B01D 2255/40* (2013.01); *B01D 2255/407* (2013.01); *B01D 2255/908* (2013.01); *B01D 2255/9022* (2013.01); *B01D 2255/9025* (2013.01); *B01D 2255/9032* (2013.01); *B01D 2255/9035* (2013.01); *B01D 2255/9037* (2013.01); *B01D 2255/9155* (2013.01); *B01D 2255/9202* (2013.01); *B01D 2255/9207* (2013.01); *B01D 2258/012* (2013.01); *B01J 2523/00* (2013.01); *F01N 2510/0684* (2013.01); *Y02T 10/22* (2013.01)

(58) Field of Classification Search
CPC .............. B01D 53/9445; B01D 53/945; B01D 2255/1023; B01D 2255/1025; B01D 2255/407; B01D 2255/902; B01D 2255/9022; B01J 23/10; B01J 23/44; B01J 23/464; B01J 23/63; B01J 2523/822; B01J 2523/824; F01N 3/101
See application file for complete search history.

(56) References Cited

U.S. PATENT DOCUMENTS

| | | | |
|---|---|---|---|
| 4,171,288 A | 10/1979 | Keith et al. | |
| 8,039,418 B2 * | 10/2011 | Kitamura | ............. B01D 53/925 423/213.5 |
| 8,501,661 B2 * | 8/2013 | Sunada | ................ B01D 53/945 502/304 |
| 9,517,462 B2 * | 12/2016 | Roesch | ................ B01D 53/945 |
| 2010/0135879 A1 * | 6/2010 | Roesch | ................ B01D 53/945 423/213.5 |
| 2010/0150792 A1 | 6/2010 | Kitamura et al. | |
| 2012/0180464 A1 | 7/2012 | Wei et al. | |
| 2014/0130760 A1 * | 5/2014 | Sumiya | ................ B01J 37/0244 123/1 A |
| 2014/0205523 A1 * | 7/2014 | Arnold | ..................... B01J 23/63 423/213.5 |
| 2014/0369912 A1 * | 12/2014 | Zheng | ..................... B01J 23/63 423/213.5 |

\* cited by examiner

FOREIGN PATENT DOCUMENTS

KR 2009 0128418 A * 12/2009 ........... B01D 53/945

Primary Examiner — Timothy C Vanoy
(74) Attorney, Agent, or Firm — Baltazar Gomez

(57) ABSTRACT

Provided are automotive catalyst composites having a catalytic material on a carrier, wherein the catalytic material comprises at least two layers. The first layer is deposited directly on the carrier and comprises a first palladium component supported on a first refractory metal oxide component, a first oxygen storage component, or a combination thereof. The second layer is deposited on top of the first layer and comprises a rhodium component supported on a second refractory metal oxide component and a second palladium component supported on a second oxygen storage component, a third refractory metal oxide component or a combination thereof. Generally these catalyst composites are used as three-way conversion (TWC) catalysts. Methods of making and using the same are also provided.

25 Claims, 6 Drawing Sheets

FIG. 1

| Rh/Alumina + Pd/OSC |
|---|
| Pd/OSC + Pd/Al$_2$O$_3$ + BaO |
| Monolith Carrier |

FIG. 2 COMPARATIVE

| Rh/Al$_2$O$_3$ + Rh/OSC |
|---|
| Pd/OSC + Pd/Al$_2$O$_3$ + BaO |
| Monolith Carrier |

FIG. 3

| Rh(Al$_2$O$_3$ + ZrO$_2$) + Pd/OSC |
|---|
| Pd/OSC + Pd/Al$_2$O$_3$ + BaO |
| Monolith Carrier |

FIG. 4 COMPARATIVE

| RhNd/(Al$_2$O$_3$ + ZrO$_2$) + Rh/OSC |
|---|
| Pd/OSC + Pd/Al$_2$O$_3$ + BaO |
| Monolith Carrier |

FIG. 5

| Pd/ Al₂O₃ + Rh/(Al₂O₃ + OSC) + BaO |
|---|
| Pd/Al₂O₃ + Pd/OSC + BaO |
| Monolith Carrier |

FIG. 6 COMPARATIVE

| Pd/Al₂O₃ + Pd/OSC + BaO |
|---|
| Rh/(Al₂O₃ + OSC) |
| Monolith Carrier |

FIG. 7 COMPARATIVE

| Rh/(Al₂O₃ + OSC) + BaO |
|---|
| Pd/(Al₂O₃ + OSC) + BaO |
| Monolith Carrier |

LAYERED AUTOMOTIVE CATALYST COMPOSITES

CROSS-REFERENCE TO RELATED APPLICATIONS

This application is a U.S. National Stage of International Patent Application PCT/US2016/039162, filed Jun. 24, 2016, which claims priority from U.S. Provisional Application No. 62/184,215, filed Jun. 24, 2015. The disclosures of each of the applications noted above are incorporated herein by reference in their entirety.

TECHNICAL FIELD OF THE INVENTION

This invention pertains generally to layered automotive catalysts and composites and emission treatment systems using such catalysts to treat exhaust streams of gasoline engines containing hydrocarbons, carbon monoxide, and oxides of nitrogen. More specifically, this invention is directed to three-way conversion (TWC) catalysts having rhodium and palladium on different supports present in the same top layer, which is coated on top of a palladium-containing bottom layer which is deposited onto a substrate such as a monolithic carrier.

BACKGROUND OF THE INVENTION

Emission standards for unburned hydrocarbons, carbon monoxide and nitrogen oxide contaminants continue to become more stringent. In order to meet such standards, catalytic converters containing a three-way conversion (TWC) catalyst are located in the exhaust gas line of internal combustion engines. Such catalysts promote the oxidation by oxygen in the exhaust gas stream of unburned hydrocarbons (HC) and carbon monoxide (CO) as well as the reduction of nitrogen oxides (NOx) to nitrogen. Generally, TWC catalysts substantially simultaneously oxidize carbon monoxide and hydrocarbons and reduce nitrogen oxide.

Many TWC catalysts are manufactured with at least two separate catalyst coating compositions (washcoats) that are applied in the form of aqueous dispersions as successive layers on a substrate (for example, a honeycomb body composed of ceramic or metal) in order to separate platinum group metals (PGM) such as palladium and rhodium, which represent the main catalytically active species. Separation has been considered necessary because palladium and rhodium can form an alloy, which is known to be less catalytically active.

U.S. Patent Appln. Pub. No. 2014/0205523, incorporated herein by reference, is directed to automotive catalyst composites having a two-metal containing layer, where the two-metal containing layer is formed from a single washcoat layer. This washcoat layer contains two PGMs, each of which is on its own support, resulting in a homogeneous mixture of the two supported PGMs in the same layer. This layer is coated on a carrier.

There is a continuing need to provide TWC catalysts composites that utilize metals (e.g., PGMs) efficiently and remain effective to meet regulated HC, NOx, and CO conversions.

SUMMARY OF THE INVENTION

Provided are automotive catalyst composites having a two-metal layer on a carrier, and methods of making and using these catalyst composites.

In a first aspect, the disclosure provides automotive catalyst composites comprising: a catalytic material on a carrier, the catalytic material comprising at least two layers: a first layer deposited directly on the carrier comprising a first palladium component supported on a first refractory metal oxide component, a first oxygen storage component, or a combination thereof; a second layer deposited on top of the first layer comprising a rhodium component supported on a second refractory metal oxide component and a second palladium component supported on a second oxygen storage component, a third refractory metal oxide component or a combination thereof, wherein the catalytic material is effective for carrying out three-way conversion (TWC).

In one or more embodiments, the first layer is substantially free of any other platinum group metals. The first layer may further comprise barium oxide, strontium oxide, or combinations thereof. The first layer may comprise about 40-95% (or even about 65-90%) by weight of the total palladium content of the composite and the second layer comprises about 5-60% (or even about 10-35%) by weight of the total palladium content of the composite. The second layer may comprise a weight ratio of the palladium component to the rhodium component in the range of about 0.1:1 to about 20:1 (or about 0.5:1 to about 10:1, or even about 1:1 to about 5:1). In the first layer, the palladium component may be supported on both the first refractory metal oxide component and the first oxygen storage component, the first refractory metal oxide component comprising a stabilized alumina and the first oxygen storage component comprising about 25-50% by weight of ceria based on the total weight of the first oxygen storage component. The stabilized alumina of the first refractory metal oxide component may comprise activated alumina, lanthana-alumina, baria-alumina, ceria-alumina, ceria-lanthana-alumina, zirconia-alumina, ceria-zirconia-alumina, or combinations thereof. In the second layer, the second refractory metal oxide component for supporting the rhodium component may comprise an alumina-based support or a zirconia-based support. The second refractory metal oxide component for supporting the rhodium component may comprise an activated alumina compound selected from the group consisting of alumina, zirconia-stabilized alumina, lanthana-alumina, baria-alumina, ceria-alumina, zirconia-alumina, ceria-zirconia-alumina, lanthana-zirconia-alumina, baria-lanthana-alumina, baria-lanthana-neodymia alumina, and combinations thereof. The second refractory metal oxide component for supporting the rhodium component may comprise about 20% by weight zirconia-stabilized alumina based on the total weight of the second refractory metal oxide component. The second refractory metal oxide component for supporting the rhodium component may comprise a zirconia-based support selected from the group consisting of zirconia, lanthana-zirconia, titania-zirconia, titania-lanthana-zirconia, and combinations thereof. The second palladium component of the second layer may be supported on the second oxygen storage component comprising a ceria-zirconia composite comprising about 10-50% by weight of ceria based on the total weight of the second oxygen storage component. The second palladium component of the second layer may be supported on the third refractory metal oxide component comprising alumina, stabilized alumina, praeseodymia-zirconia, or combinations thereof.

The first layer may comprise, by weight percent of the first layer: the first refractory metal oxide component in an amount of about 50-95% (or even about 20-80%); the first oxygen storage component comprising a first ceria-zirconia composite in an amount of about 20-80%; and at least one promoter or stabilizer selected from lanthana, baria, zirconia, and strontium in an amount of up to about 10% (or about 0.1-10%, or about 0.1-5%); wherein the first ceria-zirconia composite comprises ceria in an amount of about 25-50% by weight of the first ceria-zirconia composite.

The second layer may comprise, by weight percent of the second layer: the second refractory metal oxide component in an amount of about 50-80%; and the second oxygen storage component comprising a second ceria-zirconia composite or the third refractory metal oxide component in an amount of about 20-50%; at least one promoter or stabilizer selected from lanthana, baria, zirconia, and strontium in an amount of up to about 10% (or about 0.1-10%, or about 0.1-5%); wherein the second ceria-zirconia composite comprises ceria in an amount of about 10-50% by weight of the second ceria-zirconia composite.

The total palladium content of the first layer may be supported on the first refractory metal oxide component and about 40-80% of the total palladium content of the first layer is supported on the first oxygen storage component. The palladium content on the first oxygen storage component may be about 0.5-3% by weight of the first oxygen storage component and wherein the first layer optionally further comprises palladium on the first refractory metal oxide component.

The second layer may further comprise a platinum component in an amount of about 0.1 to 10 g/ft$^3$. The automotive catalyst may further comprise an undercoat layer between the carrier and the first layer, wherein the undercoat layer is substantially free of any platinum group metals and comprises alumina. The carrier may be a flow-through substrate or a wall-flow filter. The first layer may be deposited on inlet channels of a wall flow filter and the layer is deposited on outlet channels of the wall flow filter.

The palladium-containing first layer may be zoned. The second layer may be zoned. A loading of the first layer may be in the range of about 1.5-4.0 g/in$^3$ and a loading of the second layer is in the range of about 0.75-2.0 g/in$^3$.

The automotive catalyst composite may further comprise a middle palladium-containing layer between the first layer and the second layer, wherein the first layer comprises the palladium component supported on the first oxygen storage component and the middle layer comprises a palladium component supported on a fourth refractory metal oxide component and is substantially free of an oxygen storage component.

A further aspect is an exhaust gas treatment system comprising any catalyst composite disclosed herein located downstream of a gasoline engine. The automotive catalyst composite may be located downstream of a gasoline engine in a close-coupled position, in a position downstream of the close-coupled position, or both.

Another aspect is a method for treating an exhaust gas comprising hydrocarbons, carbon monoxide, and nitrogen oxides comprising: contacting the exhaust gas with any automotive catalyst composite disclosed herein.

BRIEF DESCRIPTION OF THE DRAWINGS

FIG. 1 is a schematic of a representative catalytic composite according to Example 1;
FIG. 2 is a schematic of a comparative catalytic composite according to Comparative Example 3;
FIG. 3 is a schematic of a representative catalytic composite according to Example 4;
FIG. 4 is a schematic of a comparative catalytic composite according to Comparative Example 5;
FIG. 5 is a schematic of a representative catalytic composite according to Example 7;
FIG. 6 is a schematic of a comparative catalytic composite according to Comparative Example 8;
FIG. 7 is a schematic of a comparative catalytic composite according to Comparative Example 9.

DETAILED DESCRIPTION OF THE INVENTION

Figure 8:
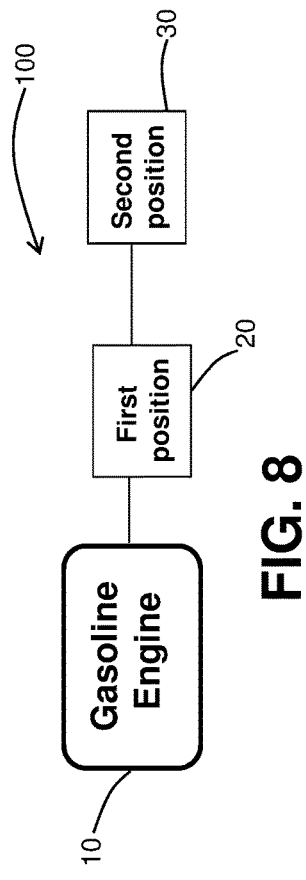
FIG. 8 is a schematic of a gasoline exhaust system.

The present disclosure provides automotive catalyst composites having a two-metal (i.e., palladium-rhodium (Pd—Rh)) layer (the "top layer" or the "second layer") coated on top of a palladium (Pd)-containing layer (the "bottom layer" or the "first layer") which is disposed directly on a carrier. Methods of making and using these catalyst composites are also provided herein. The Pd and Rh in the top layer are on individual support materials. In one or more embodiments, the Pd-containing layer is a Pd-only layer, that is, there are no other platinum group metals (PGMs) present in the layer. However, in other embodiments, a platinum component is also present in the layer.

Such a design improves the catalytic activity toward hydrocarbon (HC) and nitrogen oxides (NOx) by increasing the accessibility of the exhaust gas to the Pd and Rh metals in the top layer. The choice of support materials for Pd and Rh also improves their accessibility. For example, NOx conversion may be enhanced by supporting Pd on a particular oxygen storage component (OSC) in the top layer. HC light off temperature may be enhanced by the use of Pd/alumina or different combinations of alumina and OSC in one of the layers. For example, different Pd and Rh support materials could be used depending on the exhaust gas (NOx, HC, or CO) that needs to be reduced. The Pd in the top layer can be in the range of about 5-60 wt. % of all of the palladium present in the catalyst composite. The Rh in the top layer may be supported on refractory metal oxide supports such as an alumina-based support and/or a zirconia-based support.

The top layer is formed from a single washcoat layer that contains two platinum group metals, each of which is on its own support, resulting in a homogeneous mixture of the two supported metals present in the same layer coated on a carrier. The top washcoat/layer is designed to contain an activated alumina component for supporting rhodium as well as an activated alumina component and/or a ceria-zirconia composite for supporting palladium.

In some embodiments, such an automotive catalyst composite further comprises an undercoat layer located between the carrier and the top layer, wherein the undercoat layer is substantially free of any PGMs and comprises alumina.

In some embodiments, the automotive catalyst composite further comprises a middle palladium-containing layer between the top layer and the bottom layer. In some examples, the middle layer comprises a palladium component supported on a refractory metal oxide component. In some embodiments, the middle palladium-containing layer is substantially free of an oxygen storage component.

One or more of the platinum group metals (PGMs) present in any washcoat layer are fixed to their individual support, which means that the PGM is not soluble in the washcoat dispersion. Fixing of PGMs can occur by chemical or thermal fixation. For thermal fixing, to produce a "thermally-fixed" PGM, it is meant that the impregnated supports are treated with heat such that the PGMs are converted to their oxide forms and that upon use of the thermally-fixed PGMs on supports in an aqueous slurry, the PGMs are not soluble and do not alloy/agglomerate. For chemical fixation, the pH or some other parameter of the dispersion of the PGM salt with support is changed to render the PGM insoluble in the washcoat dispersion. Without intending to be bound by theory, it is thought that the thermally-fixed PGM contained in the homogeneously mixed two-metal layer minimizes migration of the PGMs, especially the rhodium.

Reference to "oxygen storage component" (OSC) refers to an entity that has a multi-valence state and can actively react with oxidants such as oxygen or nitrous oxides under oxidative conditions, or reacts with reductants such as carbon monoxide (CO) or hydrogen under reduction conditions. Typically, the OSC will comprise one or more reducible oxides of one or more rare earth metals. Examples of suitable oxygen storage components include ceria, praseodymia, or combinations thereof. Delivery of ceria into the layer can be achieved by the use of, for example, ceria, a mixed oxide of cerium and zirconium, and/or a mixed oxide of cerium, zirconium, yttrium, lanthanum, or optionally neodymium.

Reference to a "support" in a catalyst washcoat layer refers to a material that receives PGMs, stabilizers, promoters, binders, and the like through association, dispersion, impregnation, or other suitable methods. Examples of supports include, but are not limited to, high surface area refractory metal oxides and composites containing oxygen storage components. Exemplary support materials are high surface area aluminum oxide (>80, 90, 100, 125, or even 150 $m^2/g$) (in various modifications), zirconium oxide components that can be combined with stabilizers such as lanthana (i.e., Zr—La composites), and oxygen storage components (i.e. cerium-zirconium mixed oxides in various embodiments). Exemplary high surface area refractory metal oxides can comprise a stabilized alumina and/or an activated alumina compound selected from the group consisting of alumina, lanthana-alumina, baria-alumina, ceria-alumina, zirconia-stabilized alumina, zirconia-alumina, ceria-zirconia-alumina, lanthana-zirconia-alumina, baria-lanthana-alumina, baria-lanthana-neodymia alumina, and combinations thereof. Zirconia-based supports may be selected from the group consisting of zirconia, lanthana-zirconia, titania-zirconia, titania-lanthana-zirconia, and combinations thereof.

As used herein, "platinum group metal component," "platinum (Pt) component," "rhodium (Rh) component," "palladium (Pd) component," "iridium (Ir) component," "ruthenium (Ru) component" and the like refers the respective platinum group metal compound, complex, or the like which, upon calcination or use of the catalyst decomposes or otherwise converts to a catalytically active form, usually, the metal or the metal oxide.

"Washcoat" is a thin, adherent coating of a catalytic or other material applied to a refractory substrate, such as a honeycomb flow through monolith substrate or a filter substrate, which is sufficiently porous to permit the passage there through of the gas stream being treated. A "washcoat layer," therefore, is defined as a coating that is comprised of support particles. "BET surface area" has its usual meaning of referring to the Brunauer-Emmett-Teller method for determining surface area by $N_2$-adsorption measurements. Unless otherwise stated, "surface area" refers to BET surface area.

In the present disclosure, "%" refers to "wt. %" or "mass %", unless otherwise stated.

As used herein, the term "substantially free" means that there is generally less than about 1 wt. %, including less than about 0.75 wt. %, less than about 0.5 wt. %, less than about 0.25 wt. %, or less than about 0.1 wt. %, of metal (i.e., a PGM metal) or support material (i.e., OSC) present in the washcoat layer. In some embodiments, no such metal or support material has been intentionally added to the washcoat layer. In some embodiments, "substantially free of Pd" includes "free of Pd." Likewise, "substantially free of OSC" includes "free of OSC." It will be appreciated by one of skill in the art, however that during loading/coating, trace amounts of metal or support material may migrate from one washcoat component to another, such that trace amounts of metal or support material can be present in the washcoat of the catalyst composition.

As used herein, the term "Pd-only" refers to washcoat composition having Pd as the only metal intentionally present and that there is generally less than about 1 wt. %, including less than about 0.75 wt. %, less than about 0.5 wt. %, less than about 0.25 wt. %, or less than about 0.1 wt. %, of a second metal (i.e., a PGM metal) present in the washcoat layer. In some embodiments, no such metal has been intentionally added to the washcoat layer.

As used therein, the term "substantially uniform" means that the washcoat(s) containing any metals (e.g., PGM) and/or support materials (e.g., refractory metal oxides, OSC) were deposited onto the carrier in a consistent manner to achieve an evenly distributed coating of the washcoat, thereby having essentially the same amount of metals and/or support materials deposited onto the surface of the carrier.

A "carrier" of catalytic material is a structure that is suitable for withstanding conditions encountered in exhaust streams of combustion engines. A carrier is a ceramic or metal honeycomb structure having fine, parallel gas flow passages extending from one end of the carrier to the other. The passages may be flow through or they may be alternately blocked as wall-flow filter substrates.

In general, methods of preparing the two-metal layer of the catalyst composites disclosed herein include preparation of individual metal compositions that are fixed (e.g., thermally-fixed) and optionally well-dispersed. As such, individual platinum group metals (PGMs), such as platinum (Pt), palladium (Pd), rhodium (Rh), iridium (Ir), and/or ruthenium (Ru), are applied as nitrate solutions by impregnation to separate support materials to achieve good dispersion. That is, the nitrate solutions are diluted to the highest possible amount while delivering the desired metal loading. The individual diluted nitrate solutions are then added to the individual support materials by incipient wetness to form impregnated supports. The impregnated supports are then subsequently fired (thermally-fixed) before the aqueous washcoat dispersion is produced. Firing of the impregnated support materials leads to conversion of, e.g., the palladium nitrate and rhodium nitrate into the corresponding oxides. Without intending to be bound by theory, it is thought that the oxides are insoluble in water, which helps to prevent palladium and rhodium from redissolving. The probability of palladium-rhodium alloy formation is thus decreased, although the two PGMs are present in the same washcoat layer.

Turning to the figures, various design concepts are disclosed. FIG. 8 provides a schematic of a gasoline exhaust system 100 comprising a gasoline engine 10 and multiple possible locations for the catalysts: first position 20 is located closest to the gasoline engine and second position 30 is located downstream of first position 20. The first position 20 may be a close-coupled position depending on the automobile design. The second position 30 may be in an underfloor position. Inventive catalyst composites may be located in the first position 20, the second position 30, or both.

In some embodiments, the same carrier is coated with at least two catalyst compositions contained in separate washcoat slurries in an axially zoned configuration. For example, the same carrier is coated with a washcoat slurry of one catalyst composition and a wash coat slurry of another catalyst composition, wherein each catalyst composition is different. This embodiment may be more easily understood by reference to FIG. 9.

Figure 9:
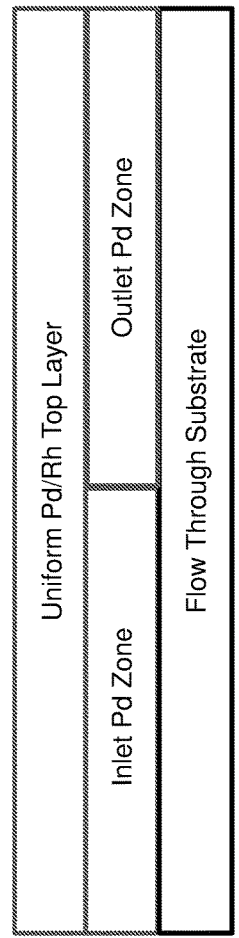
FIG. 9 is an exemplary catalyst composite showing a zoned first layer on a flow through substrate.

FIG. 9 is an exemplary catalyst composite showing a substantially uniform Pd—Rh top layer disposed on top of a zoned Pd-only bottom layer, which is coated on a flow through substrate. In this embodiment, the Pd-only bottom layer is zoned to have an "Inlet Pd Zone" and an "Outlet Pd Zone," wherein the majority of the palladium amount is present in the front/inlet Pd zone. In the bottom layer, the PGM is Pd exclusively. In some embodiment, the Pd present in the inlet zone of this layer is about 60-90% of the total Pd in the bottom layer. The Pd present in the outlet zone of this layer is about 10-40% of the total Pd in the bottom layer.

In some embodiments, Pd is available for the inlet zone. In additional embodiments, such Pd in the inlet zone comprises Pd on an OSC in amount of about 30-70% of the total Pd available for the inlet zone (remaining Pd is on the refractory alumina based support) and Pd on a refractory metal oxide. In certain such embodiments, the composition of the Pd support materials (alumina and an OSC) in both zones is the same. Washcoat loading of the bottom layer is about 1.5-4 g/in$^3$, preferably about 2-3 g/in$^3$. The total amount of the OSC in the inlet zone is about 50-80% of total dry weight. Length of the inlet zone is about 25-75% of the total length of the carrier. The substantially uniform/homogenous Pd/Rh top layer is designed as needed to meet the needs of a particular application.

Figure 10:
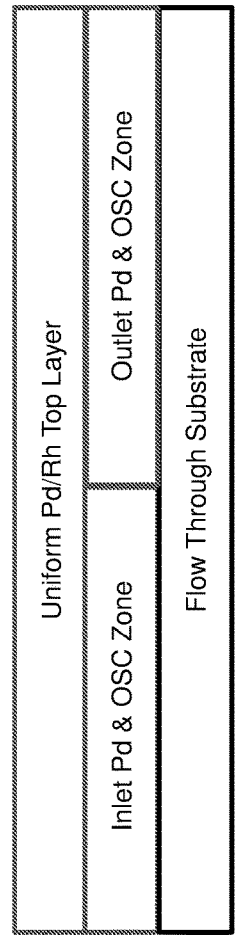
FIG. 10 is another exemplary catalyst composite showing a zoned first layer on a flow through substrate.

FIG. 10 is another exemplary catalyst composite showing a substantially uniform Pd—Rh top layer disposed on top of a zoned bottom layer, which is coated onto a flow through substrate. In this embodiment, the Pd-only bottom layer is zoned to have a majority of palladium in the Pd-only bottom layer in the front/inlet zone, wherein an OSC is present in both zones. Pd present in the inlet zone is about 60-90% of the total Pd available in the bottom layer and the OSC in the inlet zone is about 20-80% of total available OSC present in the bottom layer. In such embodiments, the Pd on the OSC in the inlet zone is greater than (e.g., about twice) the amount of Pd on the OSC in the outlet zone. The amount of Pd in the OSC in the outlet zone is about 10-40% of Pd available for the bottom layer. The amount of an OSC in the outlet zone is about 20-80% of total amount of the available OSC available in the bottom layer. Both the inlet and outlet zones in the embodiment shown in FIG. 10 further comprise Pd supported on a refractory metal oxide support. The washcoat loading of the bottom layer is about 1.5-4 g/in$^3$, preferably about 2-3 g/in$^3$. The length of the bottom layer inlet zone is generally about 25-75% of the total length of the substrate. The substantially uniform/homogenous Pd/Rh top layer is designed as needed to meet the needs of a particular application.

Figure 11:
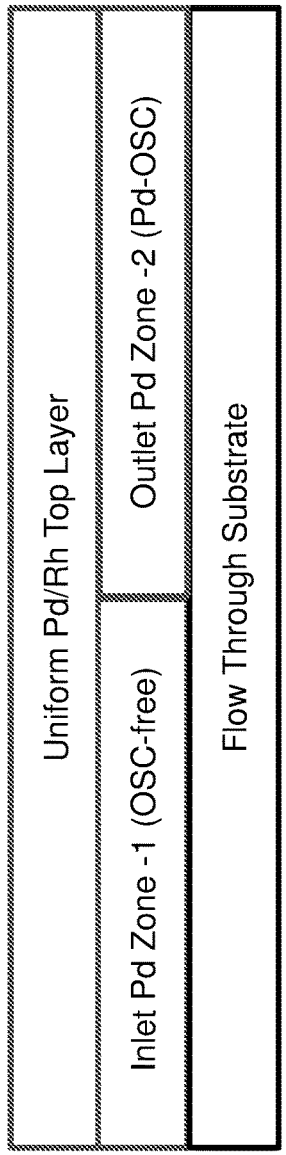
FIG. 11 is another exemplary catalyst composite showing a zoned first layer on a flow through substrate.

FIG. 11 is another exemplary catalyst composite showing a zoned first layer on a flow through substrate. In this embodiment, the inlet zone of the Pd-only layer is substantially OSC free. The Pd in the inlet zone is about 40-80% of the total Pd available in the bottom layer and the amount of OSC in the inlet zone is about zero (i.e., this zone is substantially OSC-free). The outlet zone comprises Pd on an OSC, wherein the Pd in the outlet zone is about 20-60% of the total Pd available in the bottom layer. In the outlet zone, the OSC washcoat loading is about 80-100% of the total washcoat. The outlet zone may comprise about 100% of the OSC in the layer; binders and optionally other ingredients can be added. The washcoat loading of the inlet zone is about 0.5-2.5 g/in$^3$, preferably about 1-2 g/in$^3$. The washcoat loading of the outlet zone is about 1.0-3.5 g/in$^3$, preferably about 2-3 g/in$^3$. The length of the bottom layer inlet zone is about 25-75% of the total substrate length. The substantially uniform/homogenous Pd/Rh top layer is designed as needed to meet the needs of a particular application.

Figure 12:
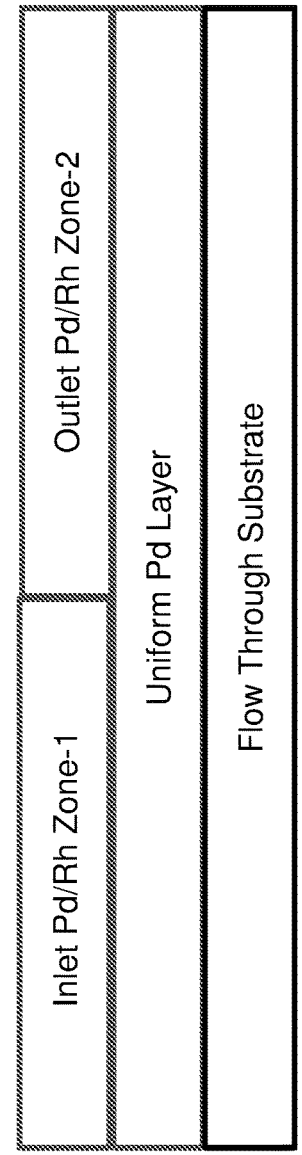
FIG. 12 is an exemplary catalyst composite showing a zoned second layer on a first layer, which is on a flow through substrate.

FIG. 12 is an exemplary catalyst composite showing a zoned top layer disposed on a bottom layer, which is coated on a flow through substrate. In this embodiment, the Pd/Rh top layer is zoned. The Pd present in the substantially uniform bottom layer is about 30-90% of Pd available for the bottom layer; preferably the Pd present in the bottom layer is about 60-90%. The amounts of Pd and Rh in the inlet zone are as follows: Pd is about 60-100% of total Pd available for the top layer and Rh is about 0-80% of total Rh available. The washcoat loading of the inlet zone is about 0.75-1.5 g/in$^3$. The Pd support of the inlet zone of the top layer can be stabilized alumina, OSC, La—ZrO$_2$, Pr—CeO$_2$, and the like. Rh supports can be alumina, ZrO$_2$—Al$_2$O$_3$, La—ZrO$_2$, and the like. The amounts of Pd and Rh in the outlet zone of the top layer are as follows: Pd is about 0-40% of available Pd for top layer and Rh is about 20-80% of Rh available. Washcoat loading of the outlet zone can be about 0.75-1.5 g/in$^3$. The Pd support of the outlet zone of the top layer can be stabilized alumina, OSC, La—ZrO$_2$, Pr—CeO$_2$, and the like. Rh supports are: alumina, ZrO$_2$—Al$_2$O$_3$, La—ZrO$_2$, and the like. The length of the top layer inlet zone is about 25-75% of the total length of the substrate.

Figure 13:
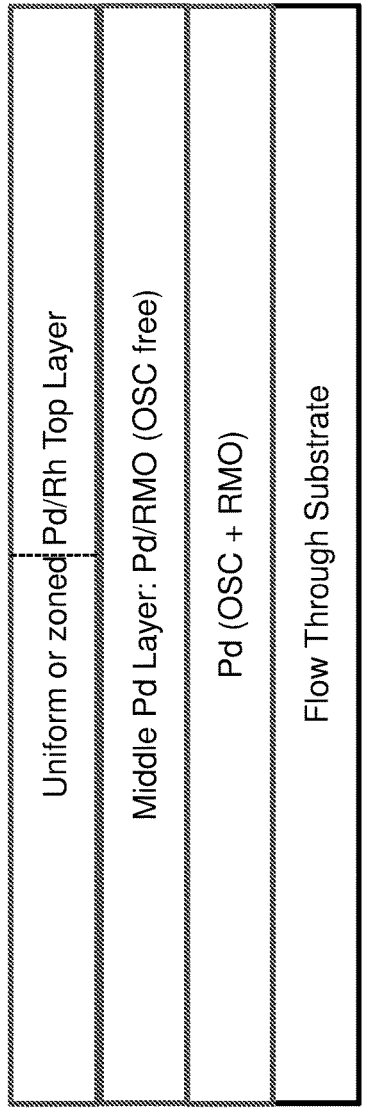
FIG. 13 is an exemplary catalyst composite having a middle palladium-containing layer between the first layer and the second layer.

FIG. 13 is an exemplary catalyst composite having a middle palladium-containing layer between the bottom layer and the top layer. In this embodiment, Pd is provided in two layers to maximize cold start HC and NOx conversion efficiency. The Pd-containing bottom layer has the following features: Pd is about 10-40% of the total Pd of the bottom layer about 80-100% of the Pd is on an OSC; about 0-20% of Pd is on a refractory metal oxide support; the total washcoat loading is about 1-2 g/in$^3$; the OSC loading is about 80-100% of the total washcoat; the refractory metal oxide loading is about 0-20%; and the coating is substantially uniform. The middle Pd layer has the following features: Pd is about 40-80% of Pd available; about 100% of the amount of Pd is on refractory metal oxides; the total wash coat loading is about 0.5-2 g/in$^3$, preferably about 1-1.5 g/in$^3$; an OSC substantially free layer; and the coating is substantially uniform. The uniform/homogenous or zoned Pd/Rh top layer is designed as needed to meet the needs of a particular application.

Figure 14:
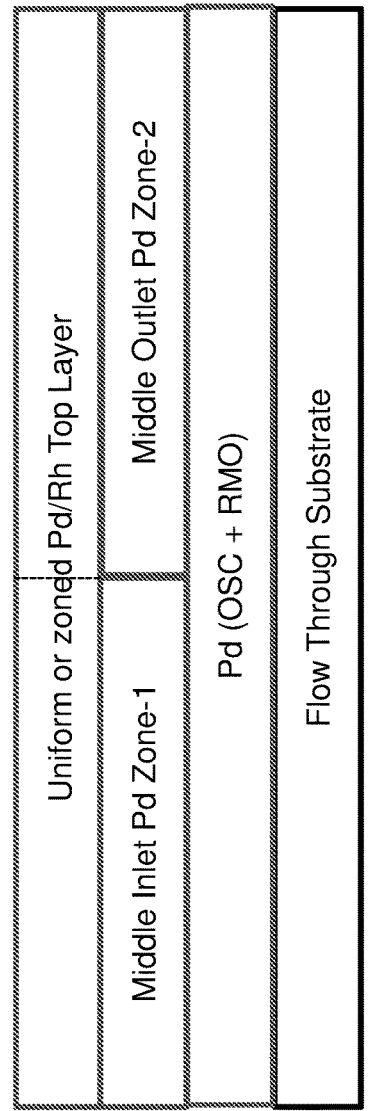
FIG. 14 is an exemplary catalyst composite having a zoned middle palladium-containing layer between the first layer and the second layer.

FIG. 14 is an exemplary catalyst composite having a zoned middle palladium-containing layer between the bottom layer and the top layer. The Pd-containing bottom layer has the following features: Pd is about 10-40% of Pd available; about 80-100% of Pd is on an OSC; about 0-20% of Pd is on refractory metal oxides; the total washcoat loading is about 1-2 g/in$^3$; the OSC loading is about 80-100% of the total wash coat; refractory metal oxide loading is about 0-20%; and the coating is substantially uniform. The zoned middle Pd-containing layer has the following features: Pd is about 40-80% of Pd available; about 100% of Pd is on refractory metal oxide; the total wash coat loading is about 0.5-2 g/in$^3$, preferably about 1-1.5 g/in$^3$; OSC substantially free layer; inlet zone has Pd in an amount of about 60-80% of the amount of Pd available for the middle layer and the outlet zone has an amount of Pd of about 20-40% of the total amount Pd available for the middle layer.

Figure 15:
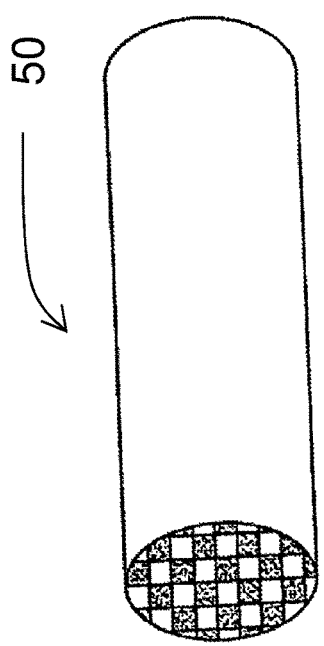
FIG. 15 is a perspective view of a wall flow filter substrate.
Figure 16:
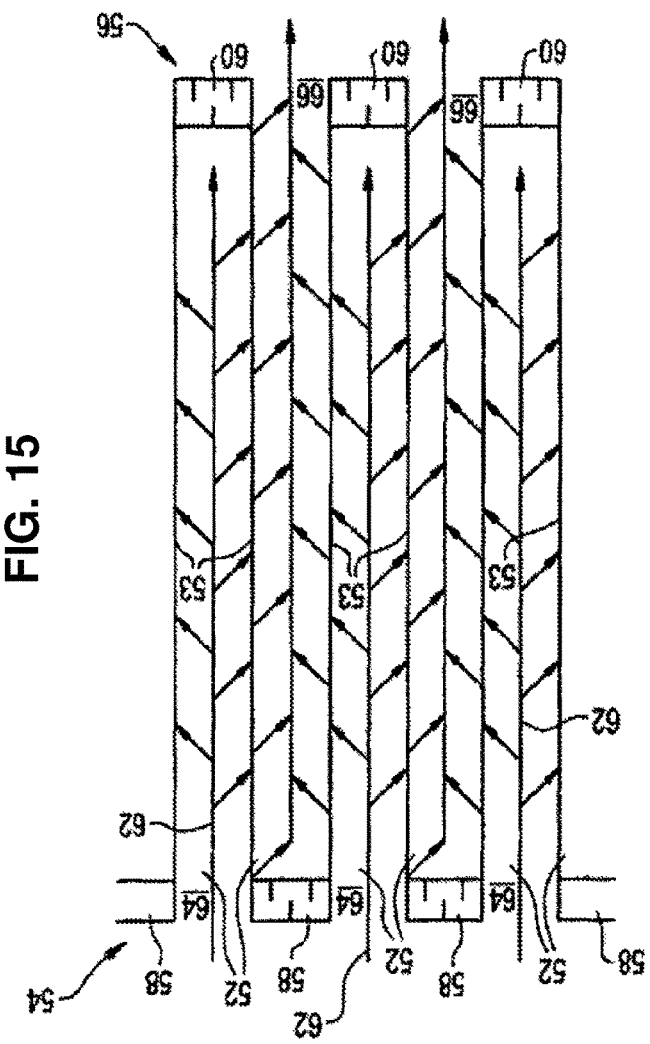
FIG. 16 is a cut-away view of a section of a wall flow filter substrate.

FIGS. 15 and 16 are different views of a wall flow filter substrate 50 which has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged inlet channels 64, is stopped by outlet plug 60 and diffuses through channel walls 53 (which are porous) to the outlet channels 66. The gas cannot pass back to the inlet side of walls because of inlet plugs 58.

In an exemplary embodiment, inlet channels 64 have a layer containing Pd as the only PGM coated thereon. The Pd is supported on an OSC and/or a refractory metal oxide support. This layer may be homogeneous or zoned. The washcoat loading may be in the range of about 1-2.5 g/in$^3$. The OSC loading may be about 50-80% of total washcoat loading. Outlet channels 66 have a Pd/Rh layer (homogeneous or zoned) with a washcoat loading in the range of about 0.5-1.5 g/in$^2$. Layer compositions and zoning configurations may be according to any of the designs disclosed herein.

Components

TWC catalysts that exhibit good activity and longevity comprise one or more platinum group metals (e.g., platinum, palladium, rhodium, rhenium and iridium) disposed on a high surface area refractory metal oxide component or support, e.g., a high surface area alumina. The support is coated on a suitable carrier or substrate such as a monolithic carrier comprising a refractory ceramic or metal honeycomb structure; or refractory particles such as spheres or short, extruded segments of a suitable refractory material. The refractory metal oxide components or supports may be stabilized against thermal degradation by materials such as zirconia, titania, alkaline earth metal oxides such as baria, calcia or strontia or, most usually, rare earth metal oxides, for example, ceria, lanthana and mixtures of two or more rare earth metal oxides. For example, see U.S. Pat. No. 4,171,288 (Keith), which is hereby incorporated in its entirety. TWC catalysts can be formulated to include an oxygen storage component (OSC) (e.g., ceria and/or praseodymia).

High surface refractory metal oxide components or supports refer to support particles having pores larger than 20 Å and a wide pore distribution. High surface area refractory metal oxide supports, e.g., alumina support materials, also referred to as "gamma alumina" or "activated alumina," typically exhibit a BET surface area in excess of 60 square meters per gram ("m$^2$/g"), often up to about 200 m$^2$/g or higher. Such activated alumina is usually a mixture of the gamma and delta phases of alumina, but may also contain substantial amounts of eta, kappa and theta alumina phases. Refractory metal oxides other than activated alumina can also be used as supports for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst.

The catalytic layer of the composites disclosed herein may also contain stabilizers and promoters, as desired. Suitable stabilizers include one or more non-reducible metal oxides wherein the metal is selected from the group consisting of barium, calcium, magnesium, strontium and mixtures thereof. Preferably, the stabilizer, where present, comprises one or more oxides of barium and/or strontium. Suitable promoters include one or more non-reducible oxides of one or more rare earth metals selected from the group consisting of lanthanum, praseodymium, yttrium, zirconium and mixtures thereof.

Carrier

In one or more embodiments, one or more catalyst compositions are disposed on a carrier. The carrier may be any of those materials typically used for preparing catalysts, and will preferably comprise a ceramic or metal honeycomb structure. Any suitable carrier may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

The carrier can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such a carrier is utilized, the resulting system will be able to remove particulate matters along with gaseous pollutants. The wall-flow filter carrier can be made from materials commonly known in the art, such as cordierite or silicon carbide.

Ceramic carriers may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

Carriers useful for the catalysts of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least about 15 wt % of the alloy, e.g., about 10-25 wt % of chromium, about 3-8 wt % of aluminum and up to about 20 wt % of nickel. The alloys may also contain small or trace amounts of one or more other metals such as manganese, copper, vanadium, titanium and the like. The surface of the metal carriers may be oxidized at high temperatures, e.g., about 1000° C. and higher, to improve the resistance to corrosion of the alloys by forming an oxide layer on the surfaces of the carriers. Such high temperature-induced oxidation may enhance the adherence of the refractory metal oxide support and catalytically promoting metal components to the carrier.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$") are used herein to mean the weight of a component per volume of the substrate, including the volume of void spaces of the substrate. Other units of weight per volume such as g/L are also sometimes used. The total loading of the catalyst composition on the carrier, such as a monolithic flow-through carrier, is typically from about 0.5 to about 6 g/in$^3$, and more typically from about 1 to about 5 g/in$^3$. Total loading of the PGM component without support material (e.g., the Pd alone or in combination with Rh) is typically in the range of about 30 to about 200 g/ft$^3$ for each individual carrier.

In alternative embodiments, one or more catalyst compositions may be deposited on an open cell foam substrate. Such substrates are well known in the art, and are typically formed of refractory ceramic or metallic materials.

Embodiments

Various embodiments are listed below. It will be understood that the embodiments listed below may be combined with all aspects and other embodiments in accordance with the scope of the invention.

Embodiment 1. An automotive catalyst composite comprising: a catalytic material on a carrier, the catalytic material comprising at least two layers: a first layer deposited directly on the carrier comprising a first palladium component supported on a first refractory metal oxide component, a first oxygen storage component, or a combination thereof; and a second layer deposited on top of the first layer comprising a rhodium component supported on a second refractory metal oxide component and a second palladium component supported on a second oxygen storage component, a third refractory metal oxide component, or a combination thereof, wherein the catalytic material is effective for three-way conversion (TWC).

Embodiment 2. The automotive catalyst composite of embodiment 1, wherein the first layer is substantially free of any other platinum group metals.

Embodiment 3. The automotive catalyst composite of embodiment 1 or 2, wherein the first layer further comprises barium oxide, strontium oxide, or combinations thereof.

Embodiment 4. The automotive catalyst composite of any of embodiments 1 to 3, wherein the first layer comprises about 40-95% (or even about 65-90%) by weight of the total palladium content of the composite and the second layer comprises about 5-60% (or even about 10-35%) by weight of the total palladium content of the composite.

Embodiment 5. The automotive catalyst composite of any of embodiments 1 to 4, wherein the weight ratio of the palladium component to the rhodium component in the second layer is about 0.1:1 to about 20:1 (or about 0.5:1 to about 10:1, or even about 1:1 to about 5:1).

Embodiment 6. The automotive catalyst composite of any of embodiments 1 to 5, wherein in the first palladium component is supported a combination of the first refractory metal oxide component and the first oxygen storage component, wherein the first refractory metal oxide component comprises a stabilized alumina and the first oxygen storage component comprises about 25-50% by weight of ceria based on the total weight of the first oxygen storage component.

Embodiment 7. The automotive catalyst composite of embodiment 6, wherein the stabilized alumina of the first refractory metal oxide component is selected from the group consisting of activated alumina, lanthana-alumina, baria-alumina, ceria-alumina, ceria-lanthana-alumina, zirconia-alumina, ceria-zirconia-alumina, or combinations thereof.

Embodiment 8. The automotive catalyst composite of any of embodiments 1 to 7, wherein in the second refractory metal oxide component comprises an alumina-based support, a zirconia-based support, or combinations thereof.

Embodiment 9. The automotive catalyst composite of any of embodiments 1 to 8, wherein the alumina-based support comprises an activated alumina compound selected from the group consisting of alumina, zirconia-stabilized alumina, lanthana-alumina, baria-alumina, ceria-alumina, zirconia-alumina, ceria-zirconia-alumina, lanthana-zirconia-alumina, baria-lanthana-alumina, baria-lanthana-neodymia alumina, and combinations thereof.

Embodiment 10. The automotive catalyst composite of any of embodiments 1 to 9, wherein the second refractory metal oxide component comprises about 20% by weight zirconia-stabilized alumina based on the total weight of the second refractory metal oxide component.

Embodiment 11. The automotive catalyst composite of any of embodiments 1 to 10, wherein the second refractory metal oxide component comprises a zirconia-based support selected from the group consisting of zirconia, lanthana-zirconia, titania-zirconia, titania-lanthana-zirconia, and combinations thereof.

Embodiment 12. The automotive catalyst composite of any of embodiments 1 to 11, wherein the second oxygen storage component comprises a ceria-zirconia composite comprising about 10-50% by weight of ceria based on the total weight of the second oxygen storage component.

Embodiment 13. The automotive catalyst composite of any of embodiments 1 to 12, wherein the second palladium component is supported on the third refractory metal oxide component comprising alumina, stabilized alumina, praeseodymia-zirconia, or combinations thereof.

Embodiment 14. The automotive catalyst composite of any of embodiments 1 to 13, wherein the first layer comprises, by weight percent of the first layer: the first refractory metal oxide component in an amount of about 50-95% (or even about 20-80%); the first oxygen storage component comprising a first ceria-zirconia composite in an amount of about 20-80%; and at least one promoter or stabilizer selected from lanthana, baria, zirconia, and strontium in an amount of up to about 10% (or even about 0.1-10%, or about 0.1-5%); wherein the first ceria-zirconia composite comprises ceria in an amount of about 25-50% by weight of the first ceria-zirconia composite.

Embodiment 15. The automotive catalyst composite of any of embodiments 1 to 14, wherein the second layer comprises, by weight percent of the second layer: the second refractory metal oxide component in an amount of about 50-80%; and the second oxygen storage component comprising a second ceria-zirconia composite or the third refractory metal oxide component in an amount of about 20-50%; at least one promoter or stabilizer selected from lanthana, baria, zirconia, and strontium in an amount of up to about 10% (or even about 0.1-10%, or about 0.1-5%); wherein the second ceria-zirconia composite comprises ceria in an amount of 10-50% by weight of the second ceria-zirconia composite.

Embodiment 16. The automotive catalyst composite of any of embodiments 1 to 15, wherein 20-60% of the total palladium content of the first layer is supported on the first refractory metal oxide component and about 40-80% of the total palladium content of the first layer is supported on the first oxygen storage component.

Embodiment 17. The automotive catalyst composite of any of embodiments 1 to 16, wherein the palladium content on the first oxygen storage component is about 0.5-3% by weight of the first oxygen storage component and wherein the first layer optionally further comprises palladium on the first refractory metal oxide component.

Embodiment 18. The automotive catalyst composite of any of embodiments 1 to 17, wherein the second layer further comprises a platinum component in an amount of about 0.1 to 10 g/ft$^3$.

Embodiment 19. The automotive catalyst composite of any of embodiments 1 to 18 further comprising an undercoat layer between the carrier and the first layer, wherein the undercoat layer is substantially free of any platinum group metals and comprises alumina.

Embodiment 20. The automotive catalyst composite of any of embodiments 1 to 19, wherein the carrier is a flow-through substrate or a wall-flow filter.

Embodiment 21. The automotive catalyst composite of any of embodiments 1 to 20, wherein the first layer is zoned.

Embodiment 22. The automotive catalyst composite of any of embodiments 1 to 21, wherein the second layer is zoned.

Embodiment 23. The automotive catalyst composite of any of embodiments 1 to 22, wherein a loading of the first layer is in the range of about 1.5-4.0 g/in$^3$ and a loading of second layer is in the range of about 0.75-2.0 g/in$^3$.

Embodiment 24. The automotive catalyst composite of any of embodiments 1 to 23 further comprising a middle palladium-containing layer between the first layer and the second layer, wherein the first layer comprises the palladium component supported on the first oxygen storage component and the middle layer comprises a palladium component supported on a fourth refractory metal oxide component and is substantially free of an oxygen storage component.

Embodiment 25. The automotive catalyst composite of embodiment 20, wherein the first layer is deposited on inlet channels of a wall flow filter and the second layer is deposited on outlet channels of the wall flow filter.

Embodiment 26. An exhaust gas treatment system comprising the catalyst composite of any of embodiments 1 to 25 located downstream of a gasoline engine.

Embodiment 27. The exhaust gas treatment system of embodiment 26, wherein the automotive catalyst composite is located downstream of a gasoline engine in a close-coupled position, in a position downstream of the close-coupled position, or both.

Embodiment 28. A method for treating an exhaust gas comprising hydrocarbons, carbon monoxide, and nitrogen oxides comprising: contacting the exhaust gas with the automotive catalyst composite of any of embodiments 1 to 25.

Embodiment 29. The automotive catalyst composites, exhaust gas treatment systems, or method of any of embodiments 1 to 28, wherein the catalytic material is effective to substantially simultaneously oxidize carbon monoxide and hydrocarbons and reduce nitrogen oxide.

EXAMPLES

The following non-limiting examples shall serve to illustrate the various embodiments of the present invention.

Example 1

A catalyst composite was prepared comprising a two-layered catalyst having palladium (Pd) as the only PGM in a first layer (i.e., bottom coat) and a combination of palladium (Pd) and rhodium (Rh) in a second layer (i.e., top coat). A schematic representation of this catalyst composite is provided in FIG. 1. The first layer (i.e., bottom coat) was prepared by separately impregnating Pd onto a stabilized alumina (i.e., first support) and impregnating Pd onto an oxygen storage component (OSC) (i.e., second support). The first impregnated support was prepared by incipient impregnation of a palladium nitrate solution, diluted to minimize the metal concentration, onto 0.6 g/in$^3$ of a high-surface area La-gamma-alumina resulting in 68.8 g/ft$^3$ Pd. The second impregnated support was prepared by adding a palladium nitrate solution, diluted to minimize the metal concentration, onto 1.50 g/in$^3$ of a ceria-zirconia composite (CeO$_2$: 40 weight %) resulting in 41.28 g/ft$^3$ Pd. The two impregnated support powders were individually thermally-fixed at 550° C. and milled A single aqueous washcoat was formed by dispersing the thermally-fixed impregnated supports in water and acid (e.g. nitric acid or acetic acid). Also, promoters of Ba, and Zr metals were dispersed therein. The remaining 27.5 g/ft$^3$ Pd (from Pd nitrate) was added directly into the finished slurry. The milled slurry was then coated onto a monolith at a loading of 2.38 g/in$^3$, dried at 110° C. in air and calcined at 550° C. in air.

The second layer (i.e., top coat) was prepared by incipient impregnation of a Rh nitrate and Nd nitrate solution, diluted to minimize the metal concentration, onto 1.0 g/in$^3$ of high-surface area La—ZrO$_2$-gamma-alumina resulting in 9.9 g/ft$^3$ Rh and 0.025 g/in$^3$ Nd$_2$O$_3$. The Rh and Nd were chemically fixed onto the alumina surface. A first slurry was made from the Rh/Nd/La—ZrO$_2$—Al$_2$O$_3$ (i.e., first support) and milled to particle size distribution at 90% less than 16-18 μm. The second support was prepared by impregnating a Pd nitrate solution, diluted to minimize the metal concentration, onto 0.25 g/in$^3$ of a ceria-zirconia composite (CeO$_2$: 40 weight %) resulting in 7.2 g/ft$^3$ Pd. The impregnated support powder was dried at 110° C. and calcined at 550° C. for 2 hours. The calcined support powder was then made into a second slurry and milled to particle size distribution at 90% less than 16-18 μm. The two slurries were mixed together. Zirconium nitrate and an alumina binder were added to the mixed slurry, which was then coated onto a monolith at a loading of 1.4 g/in$^3$, dried at 110° C. in air and calcined at 550° C. in air. The total washcoat loading after calcination was 3.7 g/in$^3$.

Example 2

Comparative

A comparative catalyst composite comprised a two-layered catalyst having palladium (Pd) as the only PGM in a first layer (i.e., bottom coat) and rhodium (Rh) as the only PGM in a second layer (i.e., top coat). A schematic representation of this catalyst composite is provided in FIG. 2. The first layer (i.e., bottom coat) was prepared by separately impregnating Pd onto stabilized alumina (i.e., first support) and impregnating Pd onto an oxygen storage component (OSC) (i.e., second support). The first impregnated support was prepared by incipient impregnation of a Pd and Nd nitrate solution, diluted to minimize the metal concentration, onto 0.75 g/in$^3$ of high-surface area La-gamma-alumina resulting in 87 g/ft$^3$ Pd and 0.025 g/in$^3$ Nd$_2$O$_3$. The second impregnated support was prepared by adding a palladium nitrate solution, diluted to minimize the metal concentration, onto 1.30 g/in$^3$ of a ceria-zirconia composite (CeO$_2$: 40 weight %) resulting in 43.4 g/ft$^3$ Pd. The two impregnated support powders were individually thermally-fixed at 550° C. and milled A single aqueous washcoat was formed by dispersed the thermally-fixed impregnated supports in water and acid (e.g. nitric acid or acetic acid). Also, promoters of Ba, Nd and Zr metals were dispersed therein. The remaining 14.5 g/ft$^3$ Pd (from Pd nitrate) were added directly into the finished slurry. The milled slurry was then coated onto a monolith at a loading of 2.38 g/in$^3$, dried at 110° C. in air and calcined at 550° C. in air.

The second layer (i.e., top coat) was prepared by adding a Rh nitrate and Nd nitrate solution into a slurry at pH 11 to 0.8 g/in$^3$ of high-surface area La-zirconia-alumina resulting in 6.9 g/ft$^3$ Rh and 0.025 g/in$^3$ Nd$_2$O$_3$. The second impregnated support was prepared by adding a Rh nitrate solution, diluted to minimize the metal concentration, onto 0.30 g/in$^3$ of a ceria-zirconia composite (CeO$_2$: 40 weight %) resulting in 2 g/ft$^3$ Rh. The two resulting slurries were milled separately to particle size distribution at 90% between 16-18 µm. Zirconium nitrate and 1 g/ft$^3$ Rh were added to the slurry to reduce pH to about 4.5-5 of the final slurry. The impregnated support powders were individually chemically fixed at 550° C. and milled. The milled slurry was then coated onto a monolith at a loading of 1.18 g/in$^3$, dried at 110° C. in air and calcined at 550° C. in air. The total washcoat loading after calcination was 3.56 g/in$^3$.

Example 3

Testing

The composites of Example 1 and Comparative Example 2 were aged for 50 hours at maximum 950° C. under fuel-cut conditions on engine. After aging the catalysts were tested on vehicle using EPA FTP-75 protocol. The performance of such samples was evaluated by measuring the cumulative total hydrocarbon (HC) and NOx emissions at mid-bed where there was no difference between the two samples in HC performance and there was an advantage for Example 1 in NOx performance. The data was as follows:

| Emissions | Example 1 | Example 2 Comparative |
|---|---|---|
| Total HC (mg/mi) | 30.3 | 32.3 |
| NOx (mg/mi) | 44.9 | 63.9 |

Example 4

A catalyst composite was prepared comprising a two-layered catalyst having palladium (Pd) as the only PGM in a first layer (i.e., bottom coat) and a combination of palladium (Pd) and rhodium (Rh) in a second layer (i.e., top coat). A schematic representation of this catalyst composite is provided in FIG. 3.

The first layer (i.e., bottom coat) was prepared by separately impregnating Pd onto stabilized alumina (i.e., first support) and impregnating Pd onto an oxygen storage component (OSC) (i.e., second support). The first impregnated support was prepared by incipient impregnation a palladium nitrate solution, diluted to minimize the metal concentration, onto 0.60 g/in$^3$ of a high-surface area La-gamma-alumina resulting in 59 g/ft$^3$ Pd. The second impregnated support was prepared by adding a palladium nitrate solution, diluted to minimize the metal concentration, onto 1.50 g/in$^3$ of a ceria-zirconia composite (CeO$_2$: 45 weight %) resulting in 52 g/ft$^3$ Pd. The two impregnated support powders were individually thermally-fixed at 550° C. and milled A single aqueous washcoat was formed by dispersing the thermally-fixed impregnated supports in water and acid (e.g. nitric acid or acetic acid). Also, promoters of Ba metal were dispersed therein. The remaining 19.5 g/ft$^3$ Pd (from Pd nitrate) was added directly into the finished slurry. An alumina binder was added to slurry, which was then coated onto a monolith at a loading of 2.38 g/in$^3$, dried at 110° C. in air and calcined at 550° C. in air.

The second layer (i.e., top coat) was prepared by incipient impregnation of a Rh nitrate and Nd nitrate solution, diluted to minimize the metal concentration, onto 0.5 g/in$^3$ of high-surface area La—ZrO$_2$-gamma-alumina and 0.5 g/in$^3$ of La—ZrO$_2$ resulting in 9.9 g/ft$^3$ Rh and 0.025 g/in$^3$ Nd$_2$O$_3$. The Rh and Nd were chemically fixed onto the alumina surface. A slurry was made from the Rh/Nd/(La—ZrO$_2$—Al$_2$O$_3$+La—ZrO$_2$) (i.e., first support) and milled to particle size distribution at 90% less than 16-18 µm. The second support was prepared by impregnating a Pd nitrate solution, diluted to minimize the metal concentration, onto 0.25 g/in$^3$ of a ceria-zirconia composite (CeO$_2$: 45 weight %) resulting in 14.5 g/ft$^3$ Pd. The impregnated support powder was dried at 110° C. and calcined at 550° C. for 2 hours. The calcined support powder was then made into a slurry and milled to particle size distribution at 90% less than 16-18 µm. The two slurries were mixed together. An alumina binder was added to the slurry, which was then coated onto a monolith at a loading of 1.3 g/in$^3$, dried at 110° C. in air and calcined at 550° C. in air. The total washcoat loading after calcination was 3.7 g/in$^3$.

Example 5

Comparative

A comparative catalyst composite comprised a two-layered catalyst having palladium (Pd) as the only PGM in a first layer (i.e., bottom coat) and rhodium (Rh) as the only PGM in a second layer (i.e., top coat). A schematic representation of this catalyst composite is provided in FIG. 4. The first layer (i.e., bottom coat) was prepared by separately impregnating Pd onto stabilized alumina (i.e., first support) and impregnating Pd onto an oxygen storage component (OSC) (i. e., second support). The first impregnated support was prepared by incipient impregnation of a palladium nitrate solution, diluted to minimize the metal concentration, onto 0.60 g/in$^3$ of high-surface area La-gamma-alumina resulting in 65 g/ft$^3$ Pd. The second impregnated support was prepared by adding a palladium nitrate solution, diluted to minimize the metal concentration, onto 1.50 g/in³ of a ceria-zirconia composite (CeO₂: 45 weight %) resulting in 58 g/ft³ Pd. The two impregnated support powders were individually thermally-fixed at 550° C. and milled. A single aqueous washcoat was formed by dispersing the thermally-fixed impregnated supports in water and acid (e.g. nitric acid or acetic acid). Also, promoters of Ba metal were dispersed therein. The remaining 21.7 g/ft³ Pd (from Pd nitrate) were added directly into the finished slurry. An alumina binder was added to the slurry, which was then coated onto a monolith at a loading of 2.38 g/in³, dried at 110° C. in air and calcined at 550° C. in air.

The second layer (i.e., top coat) was prepared by incipient impregnation of a Rh nitrate and Nd nitrate solution, diluted to minimize the metal concentration, onto 0.5 g/in³ of high-surface area La—ZrO₂-gamma-alumina and 0.5 g/in³ of La—ZrO₂ resulting in 7.4 g/ft³ Rh and 0.025 g/in³ Nd₂O₃. The Rh and Nd were chemically fixed onto the alumina surface. A first slurry was made from the Rh/Nd/(La—ZrO₂—Al₂O₃+La—ZrO₂) and milled to a particle size distribution at 90% less than 16-18 μm. The second support was prepared by a impregnating Rh nitrate solution, diluted to minimize the metal concentration, onto 0.25 g/in³ of a ceria-zirconia composite (CeO₂: 45 weight %) resulting in 2.5 g/ft³ Rh. The Rh was chemically fixed onto the alumina surface. A second slurry was made from the Rh/ceria-zirconia and milled to a particle size distribution at 90% less than 16-18 μm. The two slurries were mixed together. An alumina binder was added to the mixed slurry, which was then coated onto a monolith at a loading of 1.3 g/in³, dried at 110° C. in air and calcined at 550° C. in air. The total washcoat loading after calcination was 3.7 g/in³.

Example 6

Testing

The composites of Example 3 and Comparative Example 4 were aged for 50 hours at maximum 950° C. under fuel-cut conditions on engine. After aging the catalysts were tested on vehicle using EPA FTP-75 protocol. The performance of such samples was evaluated by measuring the cumulative total hydrocarbon (HC) and NOx emissions at mid-bed where there was no difference between the two samples in NOx performance and there was an advantage for Example 4 in HC performance. The data was as follows:

| Emissions | Example 4 | Example 5 Comparative |
|---|---|---|
| Total HC (mg/mi) | 41.5 | 44.5 |
| CO (mg/mi) | 282 | 472 |
| NOx (mg/mi) | 52 | 53 |

Example 7

A catalyst composite was prepared comprising a two-layered catalyst having palladium (Pd) as the only PGM in a first layer (i.e., bottom coat) and a combination of palladium (Pd) and rhodium (Rh) in a second layer (i.e., top coat). A schematic representation of this catalyst composite is provided in FIG. 5. The first layer (i.e., bottom coat) was prepared by impregnating Pd onto a high surface area stabilized alumina (i.e., first support) and by combining Pd and OSC (i.e., second support) in a separate slurry. The first impregnated support was prepared by incipient impregnation of a palladium nitrate solution, diluted to minimize the metal concentration, onto 0.60 g/in³ of high-surface area Ba-gamma-alumina, resulting in 48 g/ft³ Pd. The resulting impregnated powder was thermally-fixed at 550° C., made into a first slurry, and milled. The second slurry was prepared by adding Pd nitrate solution, diluted to minimize the metal concentration, to a slurry comprised of 1.25 g/in³ of ceria-zirconia composite (CeO₂: 40 weight %) at pH>10, resulting in 12 g/ft³ Pd. The resulting slurry was milled A single aqueous washcoat was formed by combining the first slurry of thermally-fixed impregnated support in water and acid (e.g. nitric acid or acetic acid) with the second slurry. Also, promoters of Ba metal were dispersed therein. An alumina binder was added to the mixed slurry, which was then coated onto a monolith at a loading of 2.115 g/in³, dried at 110° C. in air, and calcined at 550° C. in air.

The second layer (i.e., top coat) was prepared by incipient impregnation of a Pd nitrate solution, diluted to minimize the metal concentration, onto 0.25 g/in³ of high surface area La-gamma-alumina resulting in 10.0 g/ft³ Pd. The resulting impregnated support powder was thermally fixed at 550° C., made into a first slurry, and milled Rh was chemically fixed onto a high-surface area La—ZrO₂-gamma-alumina and an OSC. A second slurry was made comprising 0.6 g/in³ high surface area La—ZrO₂-gamma-alumina and 0.35 g/in³ ceria-zirconia composite (CeO₂: 40 weight %), to which a Rh nitrate solution, diluted to minimize metal concentration, was added at pH 9. The resulting second slurry was milled. Also, a Ba metal containing promoter was dispersed therein. The two slurries were mixed together. An alumina binder was added to the mixed slurry, which was then coated onto a monolith at a loading of 1.383 g/in³, dried at 110° C. in air, and calcined at 550° C. in air. The total washcoat loading after calcination was 3.497 g/in³.

Example 8

Comparative

A comparative catalyst composite comprised a two-layered catalyst having Rh as the only PGM in a first layer (i.e., bottom coat) and Pd as the only PGM in a second layer (i.e., top coat). A schematic representation of this catalyst composite is provided in FIG. 6. The first layer (i.e., bottom coat) was prepared by impregnating a Rh nitrate solution, diluted to minimize the metal concentration, onto 0.75 g/in³ high surface area La—ZrO₂-gamma-alumina and 1.0 g/in³ OSC (CeO₂: 40 weight %), resulting in 3 g/ft³ Rh. The resulting impregnated support powder was made into a slurry via dispersing in water containing monoethanolamine at pH 8. The slurry was milled A single aqueous washcoat was formed by combining the slurry with water and acid (e.g. nitric acid or acetic acid). An alumina binder was added to the slurry, which was then coated onto a monolith at a loading of 1.827 g/in³, dried at 110° C. in air, and calcined at 550° C. in air.

The second layer (i.e., top coat) was prepared by impregnating Pd onto high surface-area Ba-gamma-alumina (i.e., first support) and combining Pd and an OSC (i.e., second support) in a separate slurry. The first impregnated support was prepared by incipient impregnation of a Pd nitrate solution, diluted to minimize the metal concentration, onto 1.25 g/in³ of high surface area Ba-gamma-alumina, resulting in 52.5 g/ft³ Pd. The resulting impregnated support powder was thermally-fixed at 550° C., made into a first slurry and milled. The second slurry was prepared by adding a Pd nitrate solution, diluted to minimize the metal concentration, to a slurry comprised of 0.5 g/in³ OSC (CeO₂: 40 weight %)

at pH 9, resulting in 17.5 g/ft³ Pd. Also, a Ba metal containing promoter was dispersed therein. The resulting second slurry was milled. The two slurries were mixed together with water and acid (e.g. nitric acid or acetic acid) forming a single aqueous washcoat. An alumina binder was added to the mixed slurry, which was then coated onto a monolith at a loading of 1.876 g/in³, dried at 110° C. in air, and calcined at 550° C. in air. The total washcoat loading after calcination was 3.703 g/in³.

Example 9

Comparative

A comparative catalyst composite comprised a two-layered catalyst having Pd as the only PGM in a first layer (i.e., bottom coat) and Rh as the only PGM in a second layer (i.e., top coat). A schematic representation of this catalyst composite is provided in FIG. 7. The first layer was prepared by adding a Pd nitrate solution, diluted to minimize the metal concentration, to 0.60 g/in³ high surface area La-gamma-alumina and 1.25 g/in³ OSC (CeO₂: 40 weight %) at pH 9, resulting in 70.0 g/ft³ Pd. Also, a Ba metal containing promoter was dispersed therein. The resulting slurry was milled A single aqueous washcoat was formed by combining the slurry with water and acid (e.g. nitric acid or acetic acid). Also, a La-promoter was dispersed therein. An alumina binder was added to the slurry, which was then coated onto a monolith at a loading of 2.076 g/in³, dried at 110° C. in air, and calcined at 550° C. in air.

The second layer was prepared by adding a Rh nitrate solution, diluted to minimize the metal concentration, to a slurry comprised of 0.60 g/in³ high surface area La—ZrO₂-gamma-alumina and 0.35 g/in³ OSC (CeO₂: 40 weight %) at pH 9, resulting in 3.0 g/ft³ Rh. The resulting slurry was milled A single aqueous washcoat was formed by combining the slurry with water and acid (e.g. nitric acid or acetic acid). Also, a Ba metal containing promoter was dispersed therein. An alumina binder was added to the slurry, which was then coated onto a monolith at a loading of 1.027 g/in³, dried at 110° C. in air, and calcined at 550° C. in air. The total washcoat loading after calcination was 3.102 g/in³.

Example 10

Testing

The composites of Example 7 and Comparative Examples 8 and 9 were aged for 130 hours at maximum 985° C. under exothermic conditions on engine. After aging the catalysts were tested on vehicle using EPA FTP-75 protocol. The performance of such samples was evaluated by measuring the cumulative total hydrocarbon (HC) and NOx emissions at mid-bed where there was an advantage for Example 7 in all emissions performances. The data was as follows:

| Emissions | Example 7 | Example 8 Comparative | Example 9 Comparative |
|---|---|---|---|
| Total HC (mg/mi) | 23.1 | 28.1 | 33.9 |
| CO (g/mi) | 0.8725 | 1.4897 | 1.6856 |
| NOx (mg/mi) | 61.4 | 89.8 | 75.3 |

Example 11

A catalyst composite for use in a close-coupled position (first position downstream of gasoline engine) was prepared comprising a two-layered catalyst having palladium (Pd) as the PGM only in a first layer (i.e., bottom coat) and a combination of palladium (Pd) and rhodium (Rh) in a second layer (i.e., top coat). A schematic representation of this catalyst composite is provided in FIG. 1. The first layer (i.e., bottom coat) was prepared by separately impregnating Pd onto a stabilized alumina (i.e., first support) and impregnating Pd onto an oxygen storage component (OSC) (i.e., second support). The first impregnated support was prepared by incipient impregnation of a palladium nitrate solution, diluted to minimize the metal concentration, onto 0.6 g/in³ of a high-surface area La-gamma-alumina resulting in 58 g/ft³ Pd. The second impregnated support was prepared by adding a palladium nitrate solution, diluted to minimize the metal concentration, onto 1.50 g/in³ of a ceria-zirconia composite (CeO₂: 40 weight %) resulting in 28 g/ft³ Pd. The two impregnated support powders were individually thermally-fixed at 550° C. and milled A single aqueous washcoat was formed by dispersing the thermally-fixed impregnated supports in water and acid (e.g. nitric acid or acetic acid). Also, promoters of Ba, and Zr metals were dispersed therein. The milled slurry was then coated onto a monolith at a loading of 2.38 g/in³, dried at 110° C. in air and calcined at 550° C. in air.

The second layer (i.e., top coat) was prepared by incipient impregnation of a Rh nitrate and Nd nitrate solution, diluted to minimize the metal concentration, onto 1.0 g/in³ of high-surface area La—ZrO₂-gamma-alumina resulting in 5 g/ft³ Rh and 0.025 g/in³ Nd₂O₃. The Rh and Nd were chemically fixed onto the alumina surface. A first slurry was made from the Rh/Nd/La—ZrO₂—Al₂O₃ (i.e., first support) and milled to particle size distribution at 90% less than 12-14 µm. The second support was prepared by impregnating Pd nitrate solution, diluted to minimize the metal concentration, onto 0.25 g/in³ of a ceria-zirconia composite (CeO₂: 40 weight %) resulting in 9 g/ft³ Pd. The impregnated support powder was dried at 110° C. and calcined at 550° C. for 2 hours. The calcined support powder was then made into a second slurry and milled to particle size distribution at 90% less than 16-18 µm. The two slurries were mixed together. Zirconium nitrate and an alumina binder were added to the mixed slurry, which was then coated onto a monolith at a loading of 1.4 g/in³, dried at 110° C. in air and calcined at 550° C. in air. The total washcoat loading after calcination was 3.7 g/in³.

Example 12

Comparative

A comparative catalyst composite for use in an underfloor position (second position downstream of gasoline engine) was prepared comprising a two-layered catalyst having palladium (Pd) as the only PGM in a first layer (i.e., bottom coat) and rhodium (Rh) as the only PGM in a second layer (i.e., top coat). The first layer (i.e., bottom coat) was prepared by separately impregnating Pd onto stabilized alumina (i.e., first support) and impregnating Pd onto an oxygen storage component (OSC) (i.e., second support). The first impregnated support was prepared by incipient impregnation of a Pd nitrate solution, diluted to minimize the metal concentration, onto 2.35 g/in³ of high-surface area La-gamma-alumina (1.5 g/ft³ Pd). The second impregnated support was prepared by adding a palladium nitrate solution, diluted to minimize the metal concentration, onto 0.5 g/in³ of a ceria-zirconia composite (CeO₂: 40 weight %) resulting in a total of 18 g/ft³ Pd. The two impregnated support powders were individually thermally-fixed at 550° C. and milled A single aqueous washcoat was formed by dispersing the thermally-fixed impregnated supports in water and acid (e.g. nitric acid or acetic acid). Also, promoters of Ba, Nd and Zr metals were dispersed therein. The remaining 14.5 g/ft$^3$ Pd (from Pd nitrate) were added directly into the mixed slurry. The milled slurry was then coated onto a monolith at a loading of 2.38 g/in$^3$, dried at 110° C. in air and calcined at 550° C. in air.

The second layer (i.e., top coat) was prepared by adding an Rh nitrate solution to two supports: 1.5 g/in$^3$ high-surface area La-zirconia-alumina and 0.50 g/in$^3$ of a ceria-zirconia composite (CeO$_2$: 10 weight %) resulting in 1.6 g/ft$^3$ Rh. The two impregnated supports were made into a slurry and milled to particle size distribution at 90% between 16 & 18 µm. The milled slurry was then coated onto a monolith at a loading of 1.18 g/in$^3$, dried at 110° C. in air and calcined at 550° C. in air. The total washcoat loading after calcination was 3.56 g/in$^3$.

Example 13

A catalyst composite for use in an underfloor position (second position downstream of gasoline engine) was prepared comprising a two-layered catalyst having palladium (Pd) as the only PGM in a first layer (i.e., bottom coat) and a combination of palladium (Pd) and rhodium (Rh) in a second layer (i.e., top coat). A schematic representation of this catalyst composite is provided in FIG. 1. Preparation was in accordance with Example 11, to achieve about 16 g/ft$^3$ of Pd in the bottom coat and 2 g/ft$^3$ in the top coat and about 1.6 g/ft$^3$ Rh in the top coat.

Example 14

Testing
A testing system in accordance with FIG. 8 was used with Example 11 engine-aged (1050° C. for 150 hours) in the first position and either Comparative Example 12 and Example 13 in the second position. Prior to testing, the composites of Comparative Example 12 and Example 13 were engine-aged (1080° C. for 150 hours). After aging, the catalysts were tested on vehicle using EPA FTP-75 protocol. The performance of such samples was evaluated by measuring the cumulative total hydrocarbon (HC) and NOx emissions at mid-bed where there was no difference between the two samples in HC performance and there was an advantage for Example 1 in NOx performance.

The data was as follows:
From the EPA FTP-75 testing a significant advantage for Example 13 in non-methane HC (NMHC) and NOx performance. The data was as follows:

| Emissions | Example 12 Comparative | Example 13 |
|---|---|---|
| NMHC (g/mi) | 0.035 | 0.030 |
| NOx (g/mi) | 0.030 | 0.024 |

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. An automotive catalyst composite comprising:
   a catalytic material on a carrier, the catalytic material comprising at least two layers:
      a first layer deposited directly on the carrier comprising a first palladium component supported on a first refractory metal oxide component, a first oxygen storage component, or a combination thereof; and
      a second layer deposited on top of the first layer comprising a rhodium component supported on a second refractory metal oxide component and a second palladium component supported on a second oxygen storage component, a third refractory metal oxide component or a combination thereof;
   wherein the second refractory metal oxide component comprises zirconia-stabilized alumina or a zirconia-based support selected from the group consisting of zirconia, lanthana-zirconia, titania-zirconia, titania-lanthana-zirconia, and combinations thereof,
   wherein the catalytic material is effective for carrying out three-way conversion (TWC).

2. The automotive catalyst composite of claim 1, wherein the first layer is substantially free of any other platinum group metals.

3. The automotive catalyst composite of claim 1, wherein the first layer further comprises barium oxide, strontium oxide, or combinations thereof.

4. The automotive catalyst composite of claim 1, wherein the first layer comprises about 40-95% by weight of the total palladium content of the composite and the second layer comprises about 5-60% by weight of the total palladium content of the composite.

5. The automotive catalyst composite of claim 1, wherein the weight ratio of the second palladium component to the rhodium component in the second layer is about 0.1:1 to about 20:1.

6. The automotive catalyst composite of claim 1, wherein the first palladium component is supported on a combination of the first refractory metal oxide component and the first oxygen storage component, wherein the first refractory metal oxide component comprises a stabilized alumina and the first oxygen storage component comprises 25-50% by weight of ceria based on the total weight of the first oxygen storage component.

7. The automotive catalyst composite of claim 6, wherein the stabilized alumina of the first refractory metal oxide component is selected from the group consisting of activated alumina, lanthana-alumina, baric-alumina, ceria-alumina, ceria-lanthana-alumina, zirconia-alumina, ceria-zirconia-alumina, and combinations thereof.

8. The automotive catalyst composite of claim 1, wherein the second refractory metal oxide component comprises 20% by weight zirconia-stabilized alumina based on the total weight of the second refractory metal oxide component.

9. The automotive catalyst composite of claim 1, wherein the second oxygen storage component comprises a ceria-zirconia composite comprising 10-50% by weight of ceria based on the total weight of the second oxygen storage component.

10. The automotive catalyst composite of claim 1, wherein the second palladium component is supported on the third refractory metal oxide component comprising alumina, stabilized alumina, praeseodymia-zirconia, or combinations thereof.

11. The automotive catalyst composite of claim 1, wherein the first layer comprises, by weight percent of the first layer:
the first refractory metal oxide component in an amount of about 50-95%;
the first oxygen storage component comprising a first ceria-zirconia composite in an amount of about 20-80%; and
at least one promoter or stabilizer selected from lanthana, baria, zirconia, and strontium in an amount of up to 10%;
wherein the first ceria-zirconia composite comprises ceria in an amount of about 25-50% by weight based on the total weight of the first ceria-zirconia composite.

12. The automotive catalyst composite of claim 1, wherein the second layer comprises, by weight percent of the second layer:
the second refractory metal oxide component in an amount of about 50-80%;
the second oxygen storage component comprising a second ceria-zirconia composite or the third refractory metal oxide component in an amount of about 20-50%; and
at least one promoter or stabilizer selected from lanthana, baria, zirconia, and strontium in an amount of up to 10%;
wherein the second ceria-zirconia composite, when present, comprises ceria in an amount of about 10-50% by weight based on the total weight of the second ceria-zirconia composite.

13. The automotive catalyst composite of claim 1, wherein about 20-60% of the total palladium content of the first layer is supported on the first refractory metal oxide component and about 40-80% of the total palladium content of the first layer is supported on the first oxygen storage component.

14. The automotive catalyst composite of claim 1, wherein the palladium content on the first oxygen storage component is 0.5-3% by weight of the first oxygen storage component and wherein the first layer optionally further comprises palladium on the first refractory metal oxide component.

15. The automotive catalyst composite of claim 1, wherein the second layer further comprises a platinum component in an amount in the range of about 0.1 to 10 g/ft$^3$.

16. The automotive catalyst composite of claim 1, further comprising an undercoat layer between the carrier and the first layer, wherein the undercoat layer is substantially free of any platinum group metals and comprises alumina.

17. The automotive catalyst composite of claim 1, wherein the carrier is a flow-through substrate or a wall-flow filter.

18. The automotive catalyst composite of claim 17, wherein the first layer is deposited on inlet channels of a wall-flow filter and the second layer is deposited on outlet channels of the wall-flow filter.

19. The automotive catalyst composite of claim 1, wherein the first layer is zoned.

20. The automotive catalyst composite of claim 1, wherein the second layer is zoned.

21. The automotive catalyst composite of claim 1, wherein the first layer has a loading in the range of about 1.5-4.0 g/in$^3$ and the second layer has a loading in the range of about 0.75-2.0 g/in$^3$.

22. The automotive catalyst composite of claim 1, further comprising: a middle palladium-containing layer between the first layer and the second layer, wherein the first layer comprises the first palladium component supported on the first oxygen storage component; and the middle layer comprises a palladium component supported on a fourth refractory metal oxide component and is substantially free of an oxygen storage component.

23. An exhaust gas treatment system comprising the catalyst composite of claim 1 located downstream of a gasoline engine.

24. The exhaust gas treatment system of claim 23, wherein the automotive catalyst composite is located downstream of a gasoline engine in a close-coupled position, in a position downstream of the close-coupled position, or both.

25. A method for treating an exhaust gas comprising hydrocarbons, carbon monoxide, and nitrogen oxides comprising: contacting the exhaust gas with the automotive catalyst composite of claim 1.

* * * * *